(No Model.)
W. L. BERGEN.
Drill Chuck.
No. 239,597.    Patented April 5, 1881.
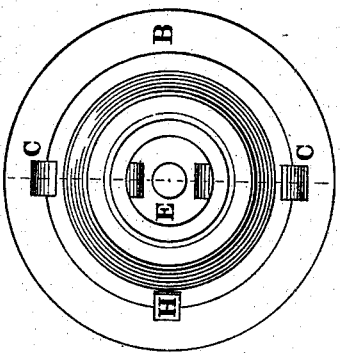
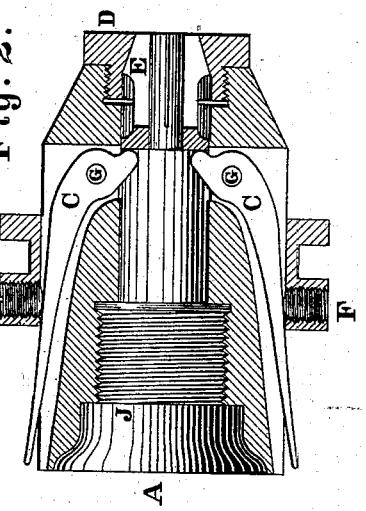
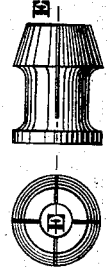
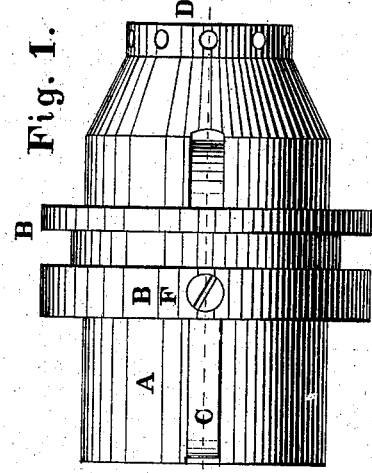
WITNESSES:
Thos. O. Perry.
Wm S. Derby
INVENTOR:
Wm L Bergen

UNITED STATES PATENT OFFICE.

WILLIAM L. BERGEN, OF BATAVIA, ILLINOIS.

DRILL-CHUCK.

SPECIFICATION forming part of Letters Patent No. 239,597, dated April 5, 1881.

Application filed October 7, 1880. (No model.)

*To all whom it may concern:*

Be it known that I, WILLIAM L. BERGEN, of Batavia, in the county of Kane and State of Illinois, have invented a new and useful Improvement in Lathe-Chucks, of which the following is a specification.

The invention relates to a chuck which may be operated to fasten and release the work without stopping or reversing the lathe.

I am aware that there are chucks in use which accomplish this result, but none, I believe, heretofore in use but what require to be attached to a lathe of special construction, thereby preventing their use in a great number of cases and for a large class of work where they might be employed with great advantage by those who have not enough special work to warrant the owning of an expensive screw-machine, which, in an ordinary machine-shop, must be idle a great part of the time.

My chuck may be applied on any engine or hand lathe to a large class of work which is now done in ordinary chucks, requiring the stopping and starting of the lathe every time the work is put in or removed, often consuming in this way a large percentage of the entire time required to do the work, while my improved chuck, used in connection with a lathe having a hollow spindle and a turret tail-stock, will do all that can be done on any of the screw-machine chucks now in general use in the making of screws or other short pieces from long rods or bars, being as convenient to operate, simpler, and more durable in construction than any of these.

In the accompanying drawings, in which similar letters of reference indicate like parts or different views of the same part, Figure 1 is a side elevation of a device embodying my invention. Fig. 2 is a horizontal section; Fig. 3, a rear view, and Fig. 4 a side and front elevation of a conical split collet for holding the work.

The body of the chuck A is of cast-iron, and is made to screw onto the front end of the lathe-spindle. The front end of the body A is bored out to allow the hardened-steel nozzle D to screw to a shoulder. The nozzle D has a cylindrical hole corresponding to the small bore of the body A, terminating in front in the frustum of a cone, as shown in Fig. 2.

E is a steel collet, with conical bearing in front, to fit the hollow cone in the nozzle D. The collet E has also a rim or flange at the rear, fitting into the small cylindrical bore of the body A. It is also bored to fit loosely over the rod or other piece which it is adapted to hold, and is split longitudinally in two or more directions from the front nearly to the rim at the rear, thus allowing it to close and tighten on the work when forced into the hollow cone of the nozzle D.

C C are steel levers working symmetrically in the body of the chuck, pivoted at G G, and moving in a plane parallel with the axis of the chuck. They are of such form and in such position that the inner ends bear against the back of the collet E, while the outer ends are of such a curve as always to maintain the same angle with the axis of the chuck at the point of contact with the screws F F in the sliding collar B, Fig. 2. B is simply an iron collar working closely but easily back and forth on the outside of the chuck, and revolving with it by means of the feather H, Fig. 3, which is fastened in the collar, and slides freely in a groove in the body of the chuck. The collar B is also provided with two hardened-steel screws, F F, Figs. 1 and 2, which bear on the curved arms of the levers C C, by which the most accurate adjustment can be made to bring the pressure evenly on both sides of the collet E. The collar B has also a groove turned in its outer surface, as shown in the drawings, Figs. 1 and 2, to admit of the ends of a forked lever or other suitable device for actuating the collar in its longitudinal motion. Furthermore, the body A has a projection continuing its outer cylindrical surface beyond the shoulder J, which (shoulder) screws against the collar of the lathe-spindle. The rim thus formed covers the collar of the lathe-spindle and the flange of the box, against which the spindle-collar runs, and extends back so as to barely clear the head-stock of the lathe, by this means giving the necessary length on the body of the chuck for the longitudinal motion of the collar B, and at the same time bringing the nozzle D, where the principal stress comes, as near as possible to the bearing of the lathe-spindle, this proximity being a matter of great importance, as the most favorable condition of a lathe-chuck for the stiffness with which it holds its work and the efficiency and accuracy with which it performs its functions is when it holds the work the nearest to the bearing of the lathe-spindle to which it is attached.

The work which the chuck is intended to perform is accomplished by sliding the collar B forward until the set-screws F F, Fig. 2, release all pressure on the levers C C. Then insert the rod or other piece to be held into the collet E, which may be done equally well whether the lathe is at rest or in motion. Then move the collar B backward until the screws F F, by forcing inward the inclined arms of the levers C C, bring the forward ends of the levers C C to bear on the rear of collet E, forcing it into the hollow cone of nozzle D, and thereby springing it together sufficiently to hold the work firmly and centrally while it is being operated upon. By moving the collar B forward again the work may be instantly released.

A chuck of this description might be made and operated with but one lever or many; but nothing less than two, as shown in Fig. 2, could give a balanced pressure on the collet E, which is necessary for the best results in efficiency and durability.

I am aware that chucks have been long in use which perform their functions by means of a split collet being forced into a conical aperture; also, that this is done by means of an arrangement of levers, as in the wire-feed and chucking device commonly used on screw-machines; but this has the levers at the rear of the lathe-spindle, and cannot be practically applied to any lathe not especially adapted to its use, and cannot be used at all on a common engine or hand lathe, while the chuck hereinbefore described has, in actual use for many weeks, performed all of the functions of a screw-machine chuck with as good results in regard to speed and quality of work as aforesaid screw-machine chucks, besides being applicable in many places where they cannot be used at all.

What I claim is—

1. A chuck fastened to the front end of a lathe-spindle having the combination, with the chuck-body A, of the levers C C, the collet E, the conical nozzle D, and the sliding collar B, substantially as and for the purpose described in the foregoing specification.

2. The projection of the body A behind the shoulder J (which screws against the collar of a lathe-spindle) on a lathe-chuck, substantially as described in above specification.

WM. L. BERGEN.

Witnesses:
GEORGE O. SPOONER,
WM. S. DERBY.